(12) United States Patent
Damien (10) Patent No.: US 7,328,521 B2
(45) Date of Patent: Feb. 12, 2008

(54) PRESSURE-ACTUATED GAS FILL/PURGE VALVE

(75) Inventor: Nicolas D. Damien, Safety Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 37 days.

(21) Appl. No.: 11/297,221

(22) Filed: Dec. 8, 2005

(65) Prior Publication Data
US 2007/0130792 A1  Jun. 14, 2007

(51) Int. Cl.
*F26B 19/00* (2006.01)
(52) U.S. Cl. .................. 34/60; 34/90; 34/221
(58) Field of Classification Search ............ 34/60, 34/90, 218, 221, 236; 96/135, 137
See application file for complete search history.

(56) References Cited

U.S. PATENT DOCUMENTS

| 3,581,490 A | * | 6/1971 | Morris ................ 60/286 |
| 4,417,858 A | * | 11/1983 | Stout ................. 417/58 |
| 5,501,242 A | * | 3/1996 | Coutts et al. .......... 137/1 |

* cited by examiner

*Primary Examiner*—S. Gravini
(74) *Attorney, Agent, or Firm*—Fogg & Powers LLC (57) ABSTRACT

An enclosure is provided. The enclosure includes at least one self-actuating valve assembly, incorporated within a wall of the enclosure, including at least one spring member, at least one pivot, attached to the at least one spring member, and at least two seal plugs, attached to the at least one spring member, wherein one of the at least two seal plugs actuates a gas purge and one of the at least two seal plugs actuates a gas fill. The enclosure also includes a retaining clip fastened to the at least one self-actuating valve assembly, wherein the retaining clip ensures that the at least two seal plugs do not unseat under dynamic environments.

17 Claims, 6 Drawing Sheets

PRESSURE-ACTUATED GAS FILL/PURGE VALVE

BACKGROUND

High reliability electronics housings are sealed with O-rings or similar seals to retain a positive internal gas pressure and to prevent an intrusion of unwanted gases from the atmosphere external to the housing. The means of filling the enclosure with a gas is either with a Schrader-type valve or a minute hole in the enclosure that is sealed once the housing is filled with the gas. In a manufacturing environment, multiple housings are filled with the gas using a chamber. After the housings are filled with the gas, the chamber is evacuated.

Schrader valves are designed such that the gas leaks out at a rate that exceeds requirements for high reliability, e.g., aerospace or tactical, electronics housings. To meet more stringent leak requirements, the valve is supplemented by a cap with a soft metal, e.g. lead, liner. However, a lead-lined seal on the cap does not prevent the gas from eventually creeping out and causing a leak. Furthermore, the Schrader valve is typically mounted in a manner that consumes an already limited amount of available space. In addition, the actual size of the Schrader valve violates envelope restrictions for the high reliability electronics housings.

Sealing of the housings during production, e.g., capping the Schrader valve or sealing the minute hole, is a manual process that must be performed within a very short time frame. Furthermore, the attachment of a hose to the Schrader valve to effect a gas fill/purge is another time-consuming, manual process. Sealing the minute hole is not conducive to filling or purging the gas from the electronics housings at a later time. The amount of labor involved with any of these scenarios is not compatible with high unit production rates.

SUMMARY

Embodiments of the present invention address problems with pressure actuating of a gas fill/purge valve and will be understood by reading and studying the following specification. Particularly, in one embodiment, a method for actuating a gas fill and purge prior to sealing an enclosure is provided. The method involves forcing at least one first seal plug open when external gas pressure surrounding an enclosure is substantially higher than internal gas pressure within the enclosure, permitting a gas to flow into the enclosure, seating the at least one first seal plug to effect a first seal when a pressure field surrounding the enclosure is substantially equal to the internal pressure, forcing at least one second seal plug open when the internal gas pressure within the enclosure is substantially higher that the external gas pressure surrounding the enclosure, allowing the gas to flow out of the enclosure, and seating the at least one second seal plug to effect a second seal when a pressure field within the enclosure is substantially equal to the external pressure surrounding the enclosure. The method also involves the opening and the closing of the at least one first seal plug and the at least one second seal plug without manual intervention.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention address problems with pressure actuating of a gas fill/purge valve and will be understood by reading and studying the following specification. Particularly, in one embodiment, a method for actuating a gas fill and purge prior to sealing an enclosure is provided. The method involves forcing at least one first seal plug open when external gas pressure surrounding an enclosure is substantially higher than internal gas pressure within the enclosure, permitting a gas to flow into the enclosure, seating the at least one first seal plug to effect a first seal when a pressure field surrounding the enclosure is substantially equal to the internal pressure, forcing at least one second seal plug open when the internal gas pressure within the enclosure is substantially higher that the external gas pressure surrounding the enclosure, allowing the gas to flow out of the enclosure, and seating the at least one second seal plug to effect a second seal when a pressure field within the enclosure is substantially equal to the external pressure surrounding the enclosure. The method also involves the opening and the closing of the at least one first seal plug and the at least one second seal plug without manual intervention.

Although the examples of embodiments in this specification are described in terms of gas fill/purge valve actuation for an electronics housing prior to being sealed, embodiments of the present invention are not limited to applications of gas fill/purge valve actuation for an electronics housing prior to being sealed. Embodiments of the present invention are applicable to any enclosure to be sealed that requires actuating a gas fill/purge valve to adjust the gas pressure within the enclosure prior to being sealed. Alternate embodiments of the present invention to those described below utilize at least two low-profile seal plugs incorporated within an enclosure to automatically actuate a gas fill/purge valve based on an external pressure surrounding the enclosure.

Figure 1:
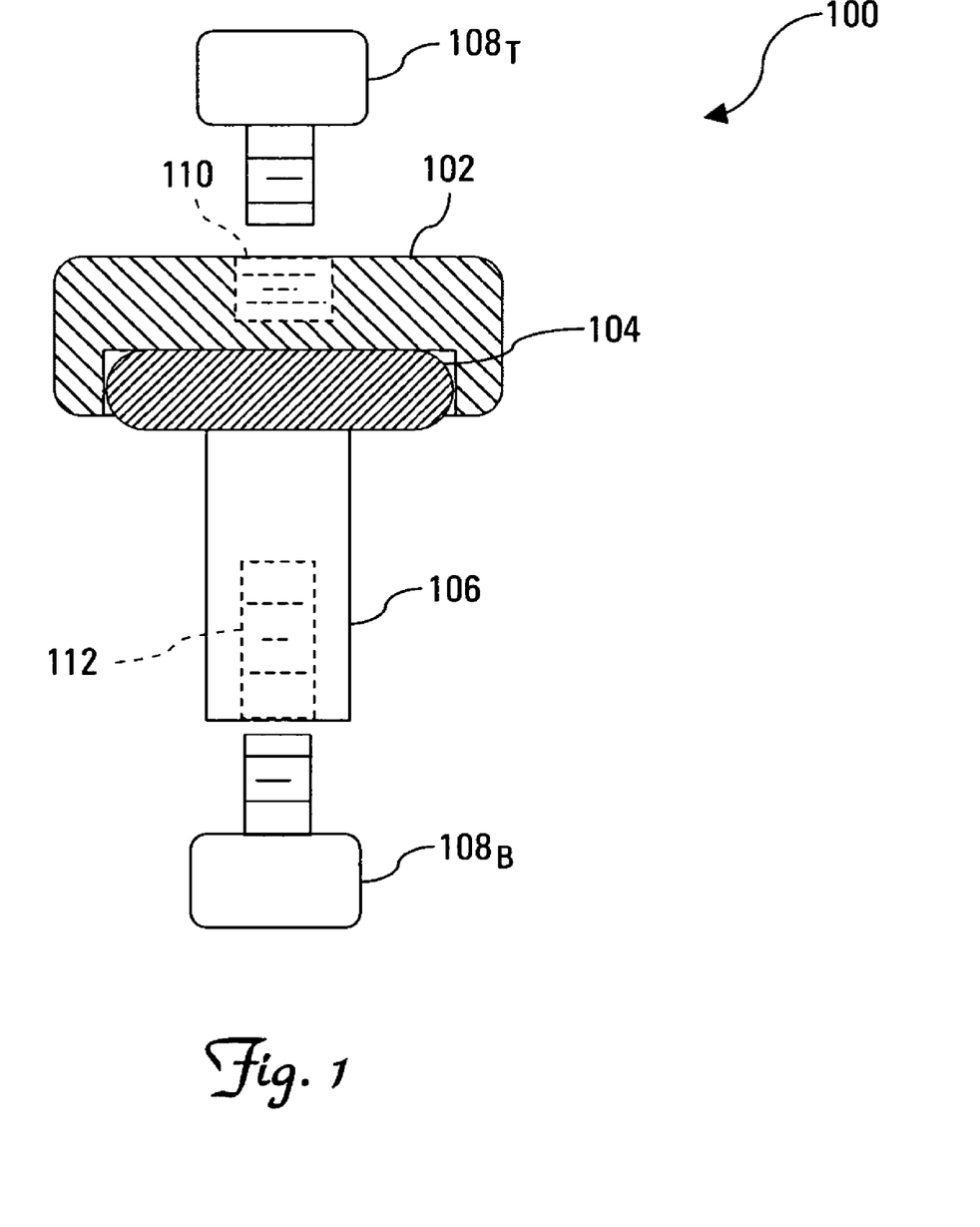
FIG. 1 is a side view of an embodiment of a seal plug used in a self-actuating gas fill/purge valve assembly in accordance with the present invention.

FIG. 1 is a side view of an embodiment of a seal plug, indicated generally at 100, used in a self-actuating gas fill/purge valve assembly according to the teachings of the present invention. Plug 100 comprises seal cover 102, seal 104, threaded shaft 106 and at least two fastening elements $108_B$ and $108_T$. In one embodiment, the at least two fastening elements $108_B$ and $108_T$ are selected from a group consisting of bolts, rivets, screws, and the like. Each element of plug 100 is discussed below.

In one embodiment, seal cover 102 and threaded shaft 106 are joined together. Seal 104 is molded in place to fit within a seat depression inside a bottom of seal cover 102 and around an attached end of threaded shaft 106. Seal 104 is constructed to prevent a gas from leaking out from or into the self-actuating valve assembly when seal cover 102 is seated as described with respect to FIG. 2 below. Seal cover 102 includes a series of internal cover threads 110 for insertion of fastening element $108_T$. Threaded shaft 106 includes a series of internal threads 112 for insertion of fastening element $108_B$. In one embodiment, fastening element $108_T$ is used to fasten plug 100 from the top of seal cover 102 to the self-actuating gas fill/purge valve assembly as described with respect to FIG. 2 below. In another embodiment, fastening element $108_B$ is used to fasten plug 100 from the bottom of threaded shaft 106 to the self-actuating gas fill/purge valve assembly as described with respect to FIG. 2 below. The construction of plug 100 enables plug 100 to either fill or purge an enclosure with a gas using the self-actuating gas fill/purge valve assembly as described with respect to FIG. 2 below.

Figure 2:
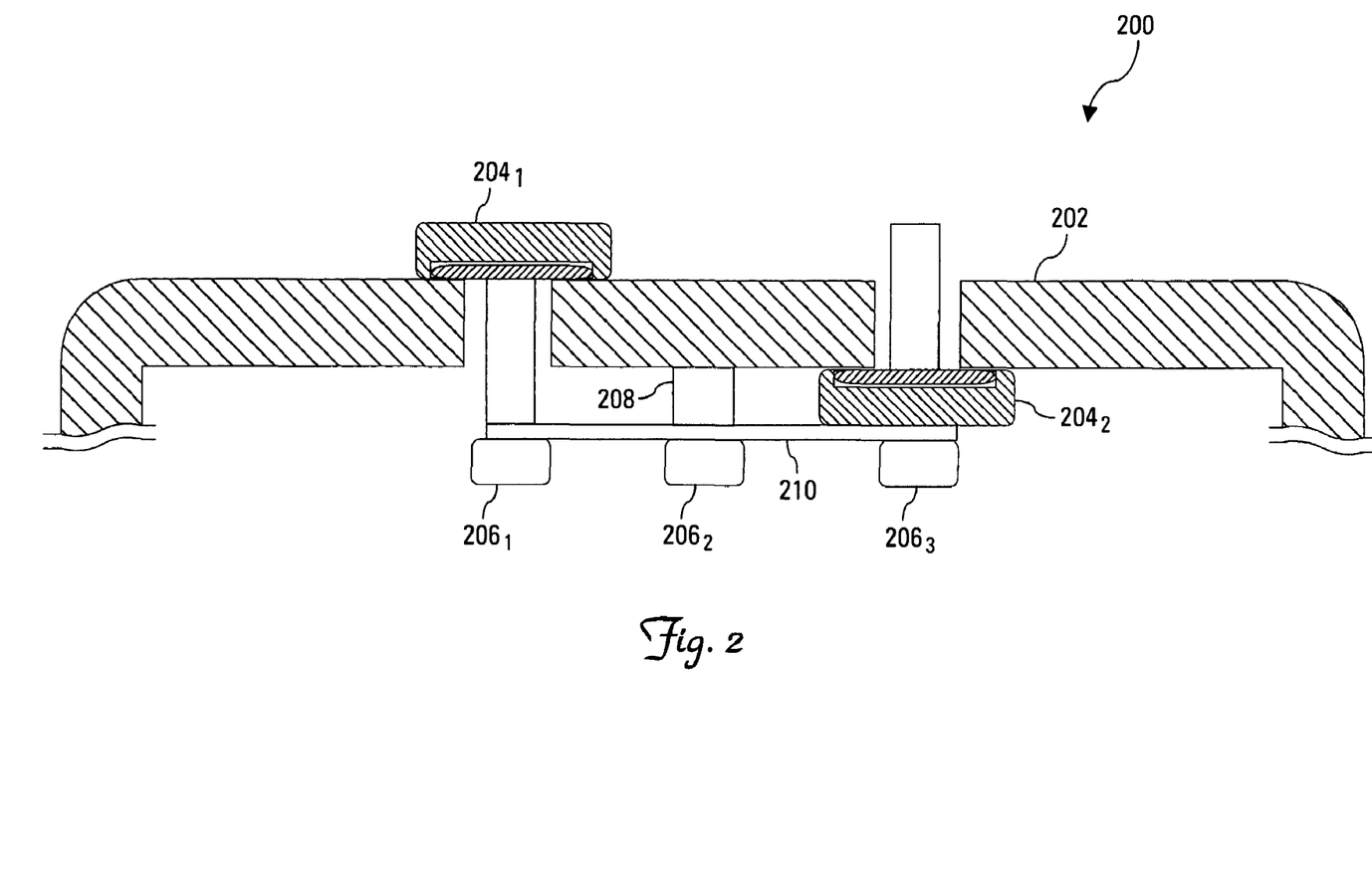
FIG. 2 is a side view of an embodiment of a self-actuating gas fill/purge valve assembly in accordance with the present invention.

FIG. 2 is a side view of an embodiment of a self-actuating gas fill/purge valve assembly, indicated generally at 200, according to the teachings of the present invention. Assembly 200 comprises at least two seal plugs $204_1$ and $204_2$ incorporated within enclosure 202. In one embodiment, enclosure 202 is an electronics housing. Moreover, seal plug $204_1$ is used to purge a first gas out of the electronics housing, and seal plug $204_2$ is used to fill the electronics housing with a second gas. In one embodiment, the at least two seal plugs $204_1$ and $204_2$ are identical to seal plug 100 described with respect to FIG. 1 above. Moreover, the at least two seal plugs $204_1$ and $204_2$ are attached to at least one spring member 210 by fastening elements $206_1$ and $206_3$, respectively. Further, spring member 210 is attached to at least one pivot 208 by fastening element $206_2$. In one embodiment, fastening elements $206_1$, $206_2$, and $206_3$ are selected from a group consisting of bolts, rivets, screws, and the like. In one embodiment, the at least one spring member 210 is a thin, rectangular beam that acts as a flexible spring. Moreover, the at least one spring member 210 is composed of a suitable material such as beryllium copper, or the like. The at least one spring member 210 is tuned to provide enough stiffness to keep the at least two seal plugs $204_1$ and $204_2$ seated during a period in which a pressure field surrounding enclosure 202 remains substantially equal between internal and external pressures experienced by enclosure 202. In one embodiment, the at least two seal plugs $204_1$ and $204_2$ are retained in a sealed position as described with respect to FIG. 5 below. Moreover, retaining the sealed position of the at least two seal plugs $204_1$ and $204_2$ occurs during the period in which the pressure field surrounding enclosure 202 remains substantially equal between the internal and external pressures experienced by enclosure 202.

Figure 3:
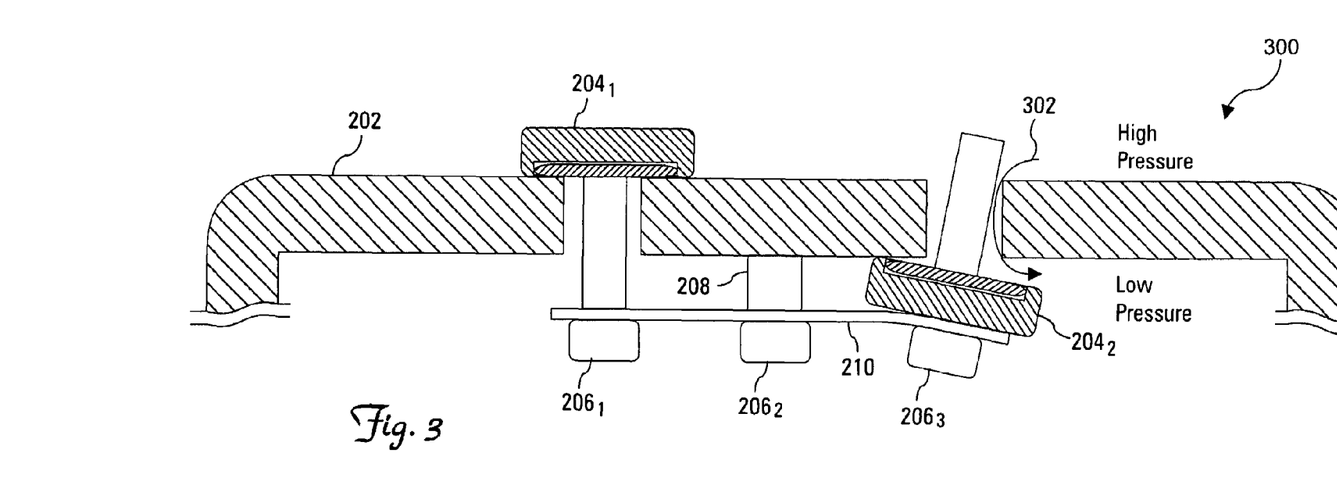
FIGS. 3 and 4 are a series of side views of an embodiment of a self-actuating gas fill/purge valve assembly under operation in accordance with the present invention.

The operation of assembly 200 will be illustrated with the aid of FIGS. 3 and 4. In one embodiment, the assembly of FIG. 3, indicated generally as 300, comprises all of the elements described above with respect to FIG. 2. When enclosure 202 is introduced to a volume of gas with a pressure value sufficient enough to overcome a spring force of spring member 210, the gas enters enclosure 202. In one embodiment, spring member 210 flexes enough to force seal plug $204_2$ to at least one open position. The at least one open position of seal plug $204_2$ permits gas to flow into the enclosure 202 as indicated by arrow 302. The gas will continue to flow into enclosure 202 as indicated by arrow 302 until the pressure field surrounding enclosure 202 remains substantially equal between the internal and external pressures experienced by enclosure 202. Once pressure is substantially equal on both sides of enclosure 202, a tuned spring force of spring member 210 overcomes seal plug $204_2$ and biases seal plugs $204_1$ and $204_2$ to at least one set of seated positions. The at least one set of seated positions creates a seal with enclosure 202.

Figure 4:
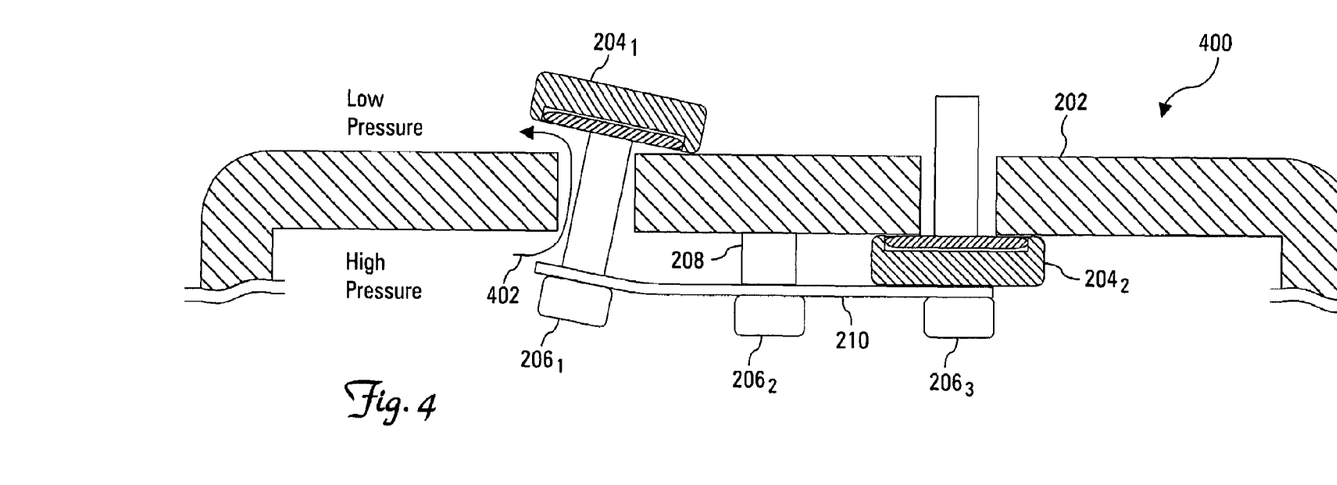

In one embodiment, the assembly of FIG. 4, indicated generally as 400, comprises all of the elements described above with respect to FIG. 2. Enclosure 202 is introduced to a volume of gas with a pressure value insufficient enough to overcome a spring force of spring member 210. The internal gas pressure of enclosure 202 flexes spring member 210 enough to force seal plug $204_1$ to at least one open position. The at least one open position of seal plug $204_1$ allows gas to flow out of enclosure 202 as indicated by arrow 402. The gas will continue to flow out of enclosure 202 as indicated by arrow 402 until the pressure field surrounding enclosure 202 remains substantially equal between the internal and external pressures experienced by enclosure 202. Once pressure is substantially equal on both sides of enclosure 202, the tuned spring force of spring member 210 overcomes seal plug $204_1$ and biases seal plugs $204_1$ and $204_2$ to the at least one set of seated positions. The at least one set of seated positions creates a seal with enclosure 202.

Figure 5:
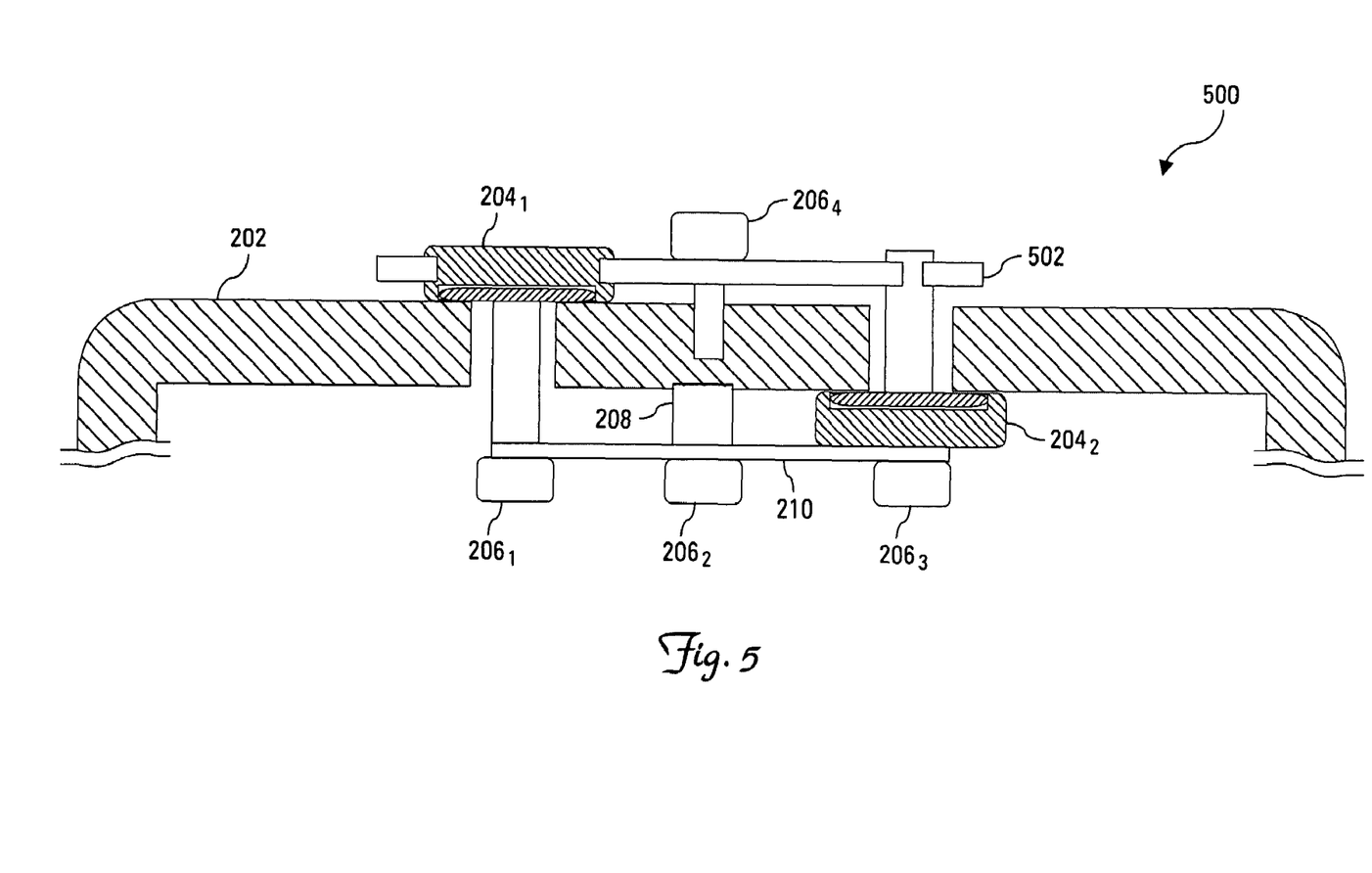
FIG. 5 is a side view of an embodiment of a self-actuating gas fill/purge valve assembly in a stable pressure field in accordance with the present invention.

FIG. 5 is a side view of an embodiment of a self-actuating gas fill/purge valve assembly, indicated generally at 500, in a stable pressure field according to the teachings of the present invention. In one embodiment, assembly 500 comprises all elements described above with respect to FIG. 2. Moreover, assembly 500 further comprises an additional fastening element, $206_4$ for attachment of retaining clip 502. In one embodiment, once the pressure field surrounding enclosure 202 remains substantially equal between the internal and external pressures experienced by enclosure 202, retaining clip 502 is snapped into place. Moreover, retaining clip 502 encircles a majority of each externally exposed end of the at least two seal plugs $204_1$ and $204_2$. In other embodiments, retaining clip 502 is formed in any other appropriate shape to lock the at least two plugs $204_1$ and $204_2$ in place. Further, retaining clip 502 is fastened to assembly 500 by fastening element $206_4$. The use of retaining clip 502 effectively seals enclosure 202. Retaining clip 502 ensures that the at least two plugs $204_1$ and $204_2$ do not unseat under dynamic environments and start to de-pressurize or re-pressurize. In one embodiment, these dynamic environments include shock, vibration, changes in ambient pressure, and the like.

Figures 6, 7:
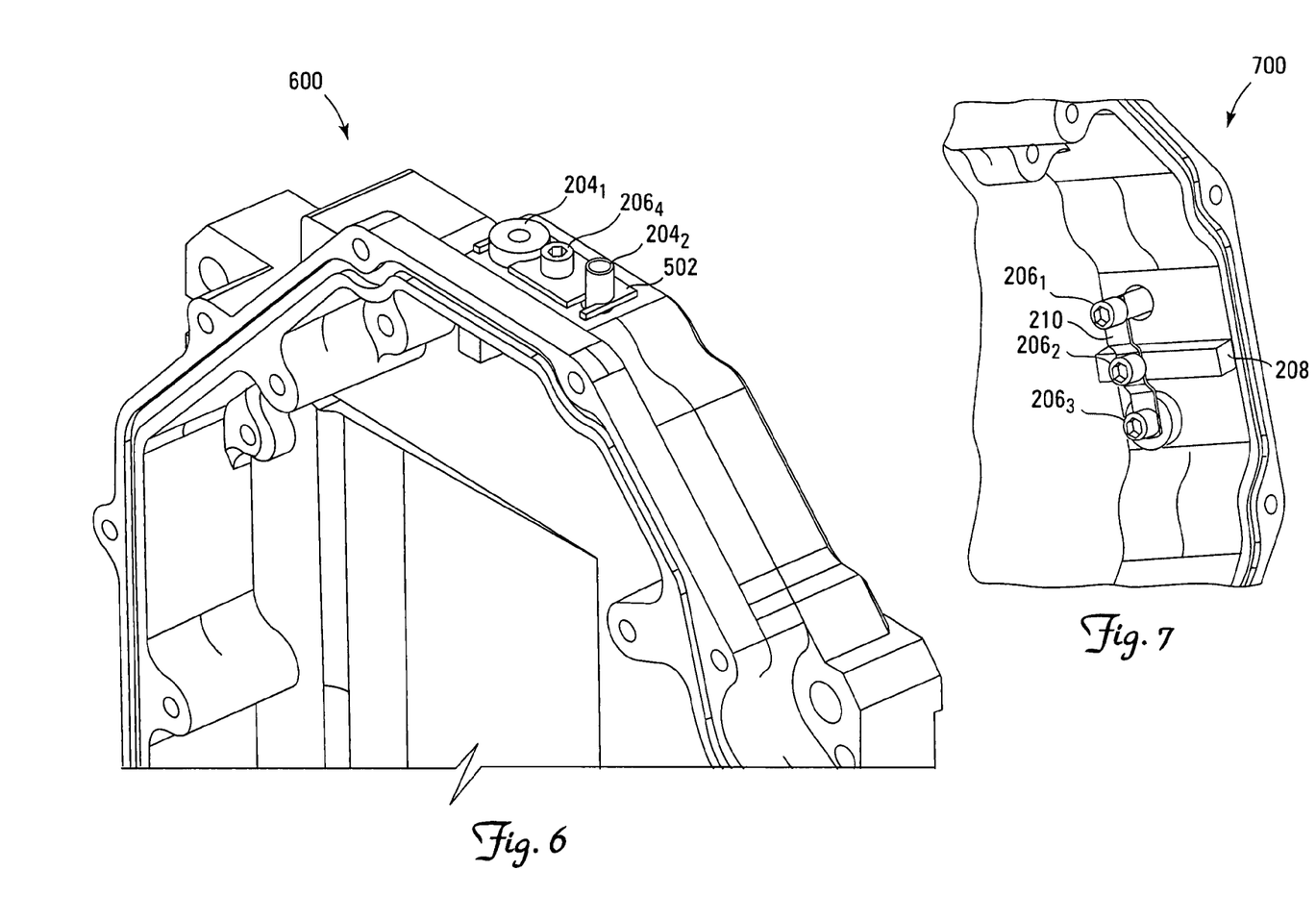
FIGS. 6 and 7 are a series of cross-sectional views of an embodiment of an electronics housing with a self-actuating gas fill/purge valve assembly in accordance with the present invention.

FIGS. 6 and 7 are a series of cross-sectional views of an embodiment of an electronics housing with a self-actuating gas fill/purge valve assembly according to the teachings of the present invention. The electronics housing, indicated generally at 600 of FIG. 6, and generally at 700 of FIG. 7, comprises at least one self-actuating gas fill/purge valve assembly described above with respect to FIG. 2. These views are illustrated herein by way of example and not by way of limitation. In one embodiment, the self-actuating gas fill/purge valve assembly has a low profile that does not protrude enough to increase the footprint of housing 600 (700). Moreover, the low profile allows a plurality of housings 600 (700) to be installed without violating any envelope restrictions within a system (not shown) requiring the use of one or more housings 600 (700).

Figure 8:
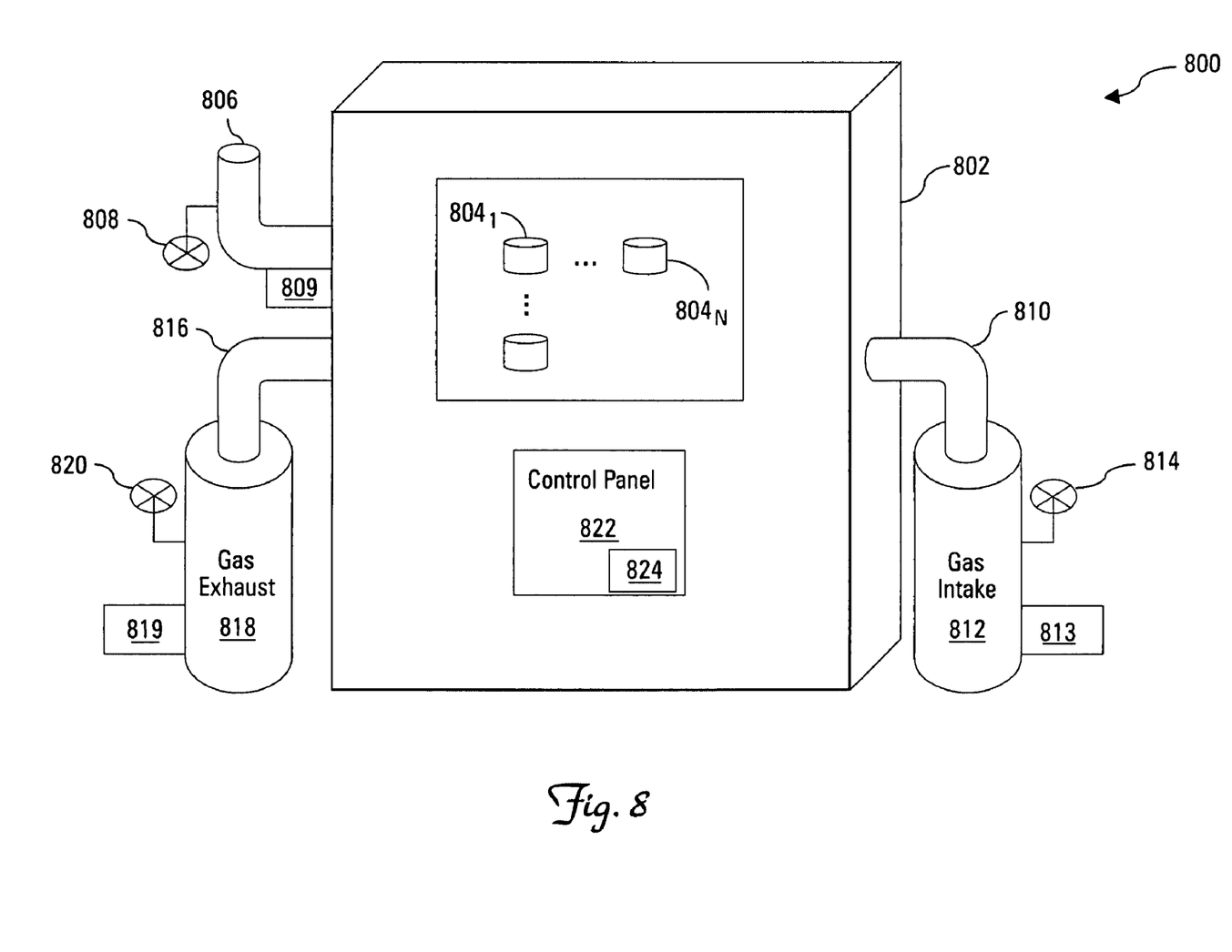
FIG. 8 is a block diagram of an embodiment of a system for sealing one or more enclosures incorporating at least one self-actuating gas fill/purge valve assembly in accordance with the present invention.

FIG. 8 is a block diagram of an embodiment of a system for sealing one or more enclosures, indicated generally at 800, using at least one self-actuating gas fill/purge valve assembly according to the teachings of the present invention. System 800 comprises pressure chamber 802, intake gas container 812, exhaust gas container 818, and exhaust vent 806. In one embodiment, both intake gas container 812 and exhaust gas container 818 are upright, cylindrical containers used to store a gas. Intake gas container 812 is mechanically coupled to pressure chamber 802 by intake gas manifold 810. Similarly, exhaust gas container 818 is mechanically coupled to pressure chamber 802 by exhaust gas manifold 816. In one embodiment, intake gas container 812 further comprises intake gas pump 813 and intake gas adjustment valve 814. Intake gas pump 813 is used to force a gas from intake gas container 812 into pressure chamber 802. Intake gas adjustment valve 814 is used to adjust an amount of the gas allowed into pressure chamber 802. Moreover, exhaust gas container 818 further comprises exhaust gas pump 819 and exhaust gas adjustment valve 820. Exhaust gas pump 819 is used to force the removal of a gas from pressure chamber 802 into exhaust gas container 818. Exhaust gas adjustment valve 820 is used to adjust an amount of the gas removed from pressure chamber 802. In one embodiment, exhaust vent 806 is mechanically coupled to pressure chamber 802 and further comprises exhaust vent adjustment valve 808 and exhaust vent pump 809. Exhaust vent adjustment valve 808 and exhaust vent pump 809 are used to purge gases from pressure chamber 802 to create a vacuum within pressure chamber 802.

In one embodiment, system 800 is used to pressurize a plurality of electronics housings $804_1$ to $804_N$. Moreover, each of electronics housings $801_1$ to $804_N$ includes at least one low-profile, self-actuating gas fill/purge valve assembly such as described above with respect to FIG. 2. Each of electronics housings $801_1$ to $804_N$ are placed inside pressure chamber 802 prior to operation. In one embodiment, the operation of pressure chamber 802 is controlled by control panel 822. Moreover, control panel 822 includes electronic circuit 824 to control and monitor the pressure inside pressure chamber 802. In one embodiment, electronic circuit 824 controls intake gas pump 813, intake gas adjustment valve 814, exhaust gas pump 819, exhaust gas adjustment valve 820, exhaust vent adjustment valve 808, and exhaust vent pump 809. In another embodiment, intake gas pump 813, intake gas adjustment valve 814, exhaust gas pump 819, exhaust gas adjustment valve 820, exhaust vent adjustment valve 808, and exhaust vent pump 809 are operated manually.

During a gas purge/fill process, each of electronic housings $804_1$ to $804_N$ is placed inside pressure chamber 802 at normal atmospheric pressure. In one embodiment, control panel 822 is operated to instruct electronic circuit 824 to lock pressure chamber 802. Once pressure chamber 802 is locked, control panel 822 is operated to instruct electronic circuit 824 to open exhaust vent adjustment valve 808 and engage exhaust vent pump 809 to evacuate any air or other gases within pressure chamber 802. Exhaust vent adjustment valve 808 is opened to allow the evacuated air or other gases to be vented out into the atmosphere via exhaust vent 806. As the evacuated air or other gases are vented out into the atmosphere, the at least one assembly 200 of FIG. 2 incorporated within each of electronic housings $804_1$ to $804_N$ operates as described above with respect to FIG. 4 to purge any gases from electronic housings $804_1$ to $804_N$.

Once electronic circuit 824 detects that all of the air inside pressure chamber 802 has been evacuated (or purged), exhaust vent adjustment valve 808 is closed and exhaust vent pump 809 is disengaged to prevent any air from entering pressure chamber 802. Moreover, when the operator of pressure chamber 802 is ready, a gas fill process begins by operating control panel 822 instructing electronic circuit 824 to engage intake pump 813 and open intake gas adjustment valve 814 to allow a desired amount of gas to enter pressure chamber 802 from intake gas container 812 via intake gas manifold 810. In one embodiment, the gas entering pressure chamber is dry nitrogen, or the like. Continuing with the previous embodiment, as pressure chamber 802 is pressurized, the at least one assembly 200 of FIG. 2 incorporated within each of electronic housings $804_1$ to $804_N$ operates as described above with respect to FIG. 3 to fill any gases into electronic housings $804_1$ to $804_N$.

Once electronic circuit 824 detects that the desired amount of gas has filled pressure chamber 802, i.e., the desired gas pressure has been reached, intake pump 813 is disengaged and intake gas adjustment valve 814 is closed to prevent additional gas from entering pressure chamber 802. In one embodiment, once the operator of pressure chamber 802 is satisfied that a pressure filed within pressure chamber 802 is substantially equal to an internal pressure within each of electronics housings $804_1$ to $804_N$, the operator operates control panel 822 to instruct electronic circuit 824 to engage exhaust pump 819 and open exhaust gas adjustment valve 820 to allow the gas to enter exhaust gas container 818 via exhaust gas manifold 816.

Once electronic circuit 824 detects that the interior of pressure chamber 802 has been evacuated of the gas, exhaust pump 819 is disengaged and exhaust gas adjustment valve 820 is closed. Control panel 822 is operated to instruct electronic circuit 824 to open pressure chamber 802. Each of electronics housings $804_1$ to $804_N$ are removed and effectively sealed as described with respect to FIG. 5. In this manner, a plurality of electronics housings $804_1$ to $804_N$ can be pressurized as desired at one time, increasing production for high volume manufacturing lines of high reliability electronics housings.

What is claimed is:

1. A self-actuating valve assembly, comprising:
   at least one spring member;
   at least one pivot, attached to the at least one spring member; and
   at least two seal plugs, attached to the at least one spring member, wherein one of the at least two seal plugs actuates a gas purge and one of the at least two seal plugs actuates a gas fill;
   wherein the at least one spring member retains a gas inside an enclosure while a pressure field outside the enclosure remains substantially equal between internal and external pressures experienced by the enclosure under dynamic environments.

2. The valve assembly of claim 1, wherein the at least two seal plugs further comprise:
   a seal cover, including a series of internal threads, joined together with a threaded shaft; and
   a seal, molded in place to fit within a seat depression inside a bottom of the seal cover and around an attached end of the threaded shaft.

3. The valve assembly of claim 1, wherein the at least one spring member is tuned to provide a spring force to bias each of the least two seal plugs to at least one set of seated positions.

4. The valve assembly of claim 1, wherein the at least one spring member is constructed of beryllium copper.

5. The valve assembly of claim 1, wherein the at least one spring member further comprises at least one retaining clip that encircles a majority of each externally exposed end of the at least two seal plugs.

6. The valve assembly of claim 1, wherein the at least one spring member is tuned so that when the internal pressure experienced by the enclosure is higher that the pressure field outside the enclosure by a sufficient amount, the internal pressure is able to overcome the seal plug that actuates the gas purge.

7. The valve assembly of claim 1, wherein the at least one spring member is tuned so that when the pressure field outside the enclosure is higher than the internal pressure experienced by the enclosure by a sufficient amount, the external pressure is able to overcome the seal plug that actuates the gas fill.

8. The valve assembly of claim 1, wherein the dynamic environments include shock, vibration, and changes in ambient pressure.

9. The valve assembly of claim 1, wherein the assembly is installed without violating any envelope restrictions within a system.

10. A self-actuating valve assembly, comprising:
    at least one spring member;
    at least one pivot, attached to the at least one spring member;
    a first seal plug, attached to the at least one spring member, the first seal plug comprising a first seal external to an enclosure; and
    a second seal plug, attached to the at least one spring member, the second seal plug comprising a second seal internal to the enclosure;
    wherein the first seal enables a gas purge when an internal gas pressure within the enclosure is substantially higher that external gas pressure external to the enclosure, and the second seal permits a gas fill when external gas pressure external to an enclosure is substantially higher than internal gas pressure within the enclosure.

11. The valve assembly of claim 10, wherein each of the first and second seal plugs further comprises:
    a seal cover, including a series of internal threads, joined together with a threaded shaft, wherein the first and second seals are molded in place to fit within a seat depression inside a bottom of the seal cover and around an attached end of the threaded shaft.

12. The valve assembly of claim 10, wherein the at least one spring member comprises a material that flexes to force the first seal plug open or force the second seal plug open.

13. The valve assembly of claim 10, wherein the at least one spring member keeps the first seal plug and the second seal plug seated during a period in which the pressure field outside the enclosure remains substantially equal between internal and external pressures experienced by the enclosure.

14. A self-actuating valve assembly, comprising:
    at least one spring member;
    at least one pivot, attached to the at least one spring member;
    a first seal plug, attached to the at least one spring member and external to an enclosure, wherein the first seal plug permits gas to flow into the enclosure, the first seal plug opening only when gas pressure external to the enclosure is substantially higher than an internal gas pressure of the enclosure; and
    a second seal plug, attached to the at least one spring member and internal to the enclosure, wherein the second seal plug enables gas to flow out of the enclosure, the second seal plug opening only when internal gas pressure is higher than the gas pressure external to the enclosure by a sufficient amount.

15. The valve assembly of claim 14, wherein the at least one spring member is tuned to provide a spring force to bias each of the first and second seal plugs in at least one set of seated positions during a period in which the pressure field outside of the enclosure remains substantially equal between internal and external pressures experienced by the enclosure.

16. The valve assembly of claim 14, wherein the at least one spring member is tuned so that when the internal pressure experienced by the enclosure is higher that the pressure field external to the enclosure by a sufficient amount, the internal pressure is able to overcome a spring force of the at least one spring member.

17. The valve assembly of claim 14, wherein the at least one spring member is tuned so that when the pressure field outside the enclosure is higher than the internal pressure experienced by the enclosure by a sufficient amount, the external pressure is able to overcome a spring force of the at least one spring member.

* * * * *